US007233614B2

(12) United States Patent
Hondo

(10) Patent No.: US 7,233,614 B2
(45) Date of Patent: Jun. 19, 2007

(54) CDMA RECEIVING APPARATUS AND METHOD

(75) Inventor: Shinya Hondo, Tokyo (JP)

(73) Assignee: NEC Corporation, Tokyo (JP)

( * ) Notice: Subject to any disclaimer, the term of this patent is extended or adjusted under 35 U.S.C. 154(b) by 843 days.

(21) Appl. No.: 09/918,497

(22) Filed: Aug. 1, 2001

(65) Prior Publication Data

US 2002/0018485 A1 Feb. 14, 2002

(30) Foreign Application Priority Data

Aug. 2, 2000 (JP) ............................. 2000-233841

(51) Int. Cl.
*H04B 1/00* (2006.01)
(52) U.S. Cl. ..................... 375/147; 375/316; 370/342; 370/490
(58) Field of Classification Search ................ 375/148, 375/149, 142, 150, 267, 347, 349, 147, 316; 370/335, 342, 320, 310, 487, 490
See application file for complete search history.

(56) References Cited

U.S. PATENT DOCUMENTS

| 5,859,840 | A  |   | 1/1999  | Tiedemann, Jr. et al. |         |
|-----------|----|---|---------|-----------------------|---------|
| 5,905,764 | A  | * | 5/1999  | Watanabe et al.       | 375/341 |
| 5,946,344 | A  |   | 8/1999  | Warren et al.         |         |
| 5,991,285 | A  | * | 11/1999 | Ghosh                 | 370/335 |
| 6,069,884 | A  | * | 5/2000  | Hayashi et al.        | 370/335 |
| 6,122,311 | A  | * | 9/2000  | Watanabe et al.       | 375/147 |
| 6,396,868 | B1 | * | 5/2002  | Yoon et al.           | 375/146 |
| 6,408,039 | B1 | * | 6/2002  | Ito                   | 375/347 |
| 6,574,205 | B1 | * | 6/2003  | Sato                  | 370/335 |
| 6,658,046 | B1 | * | 12/2003 | Miura                 | 375/148 |
| 6,795,488 | B1 | * | 9/2004  | Iwakiri               | 375/148 |
| 6,885,668 | B1 | * | 4/2005  | Lee et al.            | 370/395.1 |
| 6,904,080 | B1 | * | 6/2005  | Hokao                 | 375/148 |
| 6,920,122 | B1 | * | 7/2005  | Hanaoka et al.        | 370/331 |
| 2002/0169005 | A1 | * | 11/2002 | Hiramatsu et al.   | 455/561 |

FOREIGN PATENT DOCUMENTS

| JP | 04-336840 A  | 11/1992 |
| JP | 08-125577 A  | 5/1996  |
| JP | 09-247045 A  | 9/1997  |
| JP | 09-312881 A  | 12/1997 |
| JP | 2820918      | 8/1998  |
| JP | 11-88941 A   | 3/1999  |
| JP | WO 99/56475 A1 | 4/1999 |
| JP | 11-251959 A  | 9/1999  |

(Continued)

*Primary Examiner*—Jean B. Corrielus
(74) *Attorney, Agent, or Firm*—Sughrue Mion, PLLC

(57) ABSTRACT

The present invention provides a CDMA receiving apparatus capable of corresponding to the service types of data and system conditions flexibly and efficiently, so as to achieve such processing for electric power control, diversity control and the like, requested to have real-time property. A CDMA signal inputted into a memory is searched by searcher units of each reception processing block. Voice data and low-speed data are demodulated immediately by a finger unit for data field and a finger unit for control field, and combined by RAKE-combining units. Data fields of packet data and high-speed data are accumulated in memories for data field and demodulated by finger units for data field successively based on path information stored in memories for path information.

2 Claims, 12 Drawing Sheets

FOREIGN PATENT DOCUMENTS

| | | |
|---|---|---|
| JP | 11-340951 | 12/1999 |
| JP | 11-355244 A | 12/1999 |
| JP | 2000-36982 A | 2/2000 |
| JP | 2001-94472 A | 4/2001 |
| JP | 2001-197554 A | 7/2001 |
| WO | WO 99/18703 A1 | 4/1999 |
| WO | WO 00/31889 A1 | 6/2000 |
| WO | WO 00/38468 A1 | 6/2000 |

* cited by examiner

CDMA RECEIVING APPARATUS AND METHOD

BACKGROUND OF THE INVENTION

1. Technical Field of the Invention

The present invention relates to a code division multiple access (CDMA) receiving apparatus and method.

2. Description of the Prior Art

Recently, spread spectrum communication system highly insensitive to interference and disturbance has attracted public attention as one of communication methods applicable to mobile communication system. In radio communication systems using the spread spectrum signals, voice data or video data is modulated by PSK (Phase Shift Keying) or FSK (Frequency Shift Keying) or the like, and the modulated data is converted to wide-band base band signal using pseudo noise code (PN code: pseudo random noise code).

On the other hand, a receiving unit carries out despreading the received radio frequency signal using the same code as the PN code used in the transmission unit and reproduces receiving data by carrying out digital demodulation according to PSK or FSK demodulation method.

This kind of system employs RAKE receiving system as one of countermeasures against multi-path interference. That is, in radio communication system, radio wave transmitted from the transmission unit may reach the receiving unit directly or after reflected by a building or mountain.

If a radio wave reaches the receiving unit through a plurality of paths, the radio waves passing through the aforementioned a plurality of paths are synthesized in terms of vector at an antenna end of the receiving unit so as to reduce reception level. This phenomenon is called multi-path. If the multi-path interference occurs, in a system whose radio channel bandwidth is as small as 30 kHz, for example, its receiving unit is not capable of receiving radio signal. However, because in the spread spectrum communication system, its radio channel bandwidth is wide, the radio signal is always received although part of them is lost.

Thus, in the spread spectrum communication system, the multi-path receiving signal received through a single antenna is separated by the unit of each PN code length (1 chip) and inputted to a plurality of dependent demodulators. These demodulators carry out despreading with the PN code corresponding to each path so as to demodulate the receiving signals and the demodulated receiving signals through a plurality of paths are synthesized in terms of symbol so as to reproduce receiving data.

This is called RAKE receiving method because the reception signals are collected and synthesized as if the rake is employed. If the RAKE receiving method is used, time diversity is carried out, so that the reception quality in case of generating the multi-path can be increased greatly.

FIG. 12 shows a conventional CDMA receiving apparatus. Referring to FIG. 12, the CDMA receiving apparatus comprises a receiving processing control unit 85, a searcher unit 81, a finger unit 82, a RAKE combining unit 83 and a decoding unit 84. The receiving processing control unit 85 is connected to a call processing control unit 86 so that a transmission control signal from the RAKE combining unit 83 is outputted to a CDMA transmission unit 87.

A CDMA signal is inputted to the searcher unit 81 and the finger unit 82. The searcher unit 81 detects a reception timing of the CDMA signal having a high correlation value with respect to the PN code instructed by the receiving processing control unit 85 and outputs reception delay amount information of the CDMA signal to the finger unit 82.

The finger unit 82 carries out despreading, fading vector generation, detection and the like for the CDMA signal. The RAKE combining unit 83 outputs a signal obtained by combining detection signals of respective paths, inputted from the finger unit 82 to the decoding unit 84. The RAKE combining unit 83 outputs transmission control signal for power control, diversity control and the like to the CDMA transmission unit 87. The decoding unit 84 decodes a signal obtained by RAKE combining inputted from the RAKE combining unit 83 so as to obtain a desired signal.

However, because the conventional CDMA receiving apparatus has such a structure which satisfies a maximum rate of high-speed data determined depending on system condition and a maximum number of simultaneous voice data processing users (the maximum number of simultaneous processing users generally requested in the form of high-speed data is smaller than the case of voice data) with a single reception processing block, there is such a problem that the availability of the resource of the CDMA receiving apparatus drops.

For example, in case where reception processing for high-speed data is carried out, a load on the finger unit and the RAKE combining unit is increased. This means that if the operation speed of each unit is not high enough, more finger blocks and RAKE combining units are required. Conversely, because the searcher unit processes a pilot signal having the same rate in each service, it has no dependency on the rate and at the same time, depends on the number of users, which are treated simultaneously. Therefore, the resources of the finger unit and RAKE combining unit become short, so that relatively, the resource of the searcher unit becomes excessive.

In case where reception processing of voice data is carried out, a load on the searcher unit is increased. This is because a number of users is larger than that in the high-speed data. Thus, the resource of the searcher unit becomes short, so that relatively, the resources of the finger unit and the RAKE combining unit become excessive.

Further, The CDMA receiving apparatus executes demodulation processing immediately after any CDMA signal is received, irrespective of the service types. Therefore, voice reception processing in which real time processing is required cannot be carried out or may be delayed, when the number of users of high-speed data is increased and the resources in the finger unit and RAKE combining unit are consumed by the demodulation of the high speed data.

SUMMARY OF THE INVENTION

Accordingly, an object of the present invention is to provide a CDMA receiving apparatus and method capable of flexibly and efficiently coping with service types of data and system conditions such as power control and diversity control which are processed on the real time basis.

According to the present invention, there is provided a CDMA receiving apparatus for receiving data of various service types using CDMA, having a plurality of reception processing blocks for carrying out reception processing suitable for service type of the data, wherein the data is allocated to the plurality of the reception processing blocks depending on the service type of the data so as to carry out reception processing.

According to the present invention, there is provided A CDMA receiving method for receiving data of various service types using CDMA (Code Division Multiple Access) method, wherein the data is allocated to a plurality of reception processing suitable for each of various service types of the data depending on the service type of the data so as to carry out reception processing.

That is, the CDMA receiving apparatus of the present invention carries out allocation to a reception processing block and reception processing, suitable for each of the service types of data and employs the resource of the CDMA receiving apparatus, thereby establishing a stable system capable of coping with various services.

More specifically, in the CDMA receiving apparatus of the present invention, the searcher unit of each reception processing block (packet reception processing block, high-speed data reception processing block, voice data/low-speed data reception processing block) searches the CDMA signal stored in a memory for reception signal and allocates to each reception processing block for each service.

The voice data and low-speed data are demodulated immediately by the finger units for data field and the finger units for control field, and combined by the RAKE combining unit. On the other hand, data field of the packet is accumulated in a memory for data field and subjected to demodulation processing by the finger unit for data field successively according to path information stored in a memory for path information. Reception processing operation of high-speed data is the same as for the packet.

These operations enable allocation of roles of respective reception processing blocks depending on the service type of data, so that voice data required to have real time property is subjected to reception processing immediately. As a result, the high-speed data, which consumes a large amount of resources in the packet and reception processing block, not required to have real time property, can be received and processed efficiently.

According to the present invention, in the CDMA receiving apparatus for receiving data of various service types using the CDMA method, the reception processing is carried out by allocating data to a plurality of the reception processing blocks, which carry out reception processing suitable for each of service types of data, depending on the service type of data. Consequently, it is possible to correspond to the service type of data and system condition flexibly and efficiently, so as to achieve such processing for electric power control, diversity control and the like, requested to ensure real-time property, without any problem.

PREFERRED EMBODIMENT OF THE INVENTION

Figure 1:
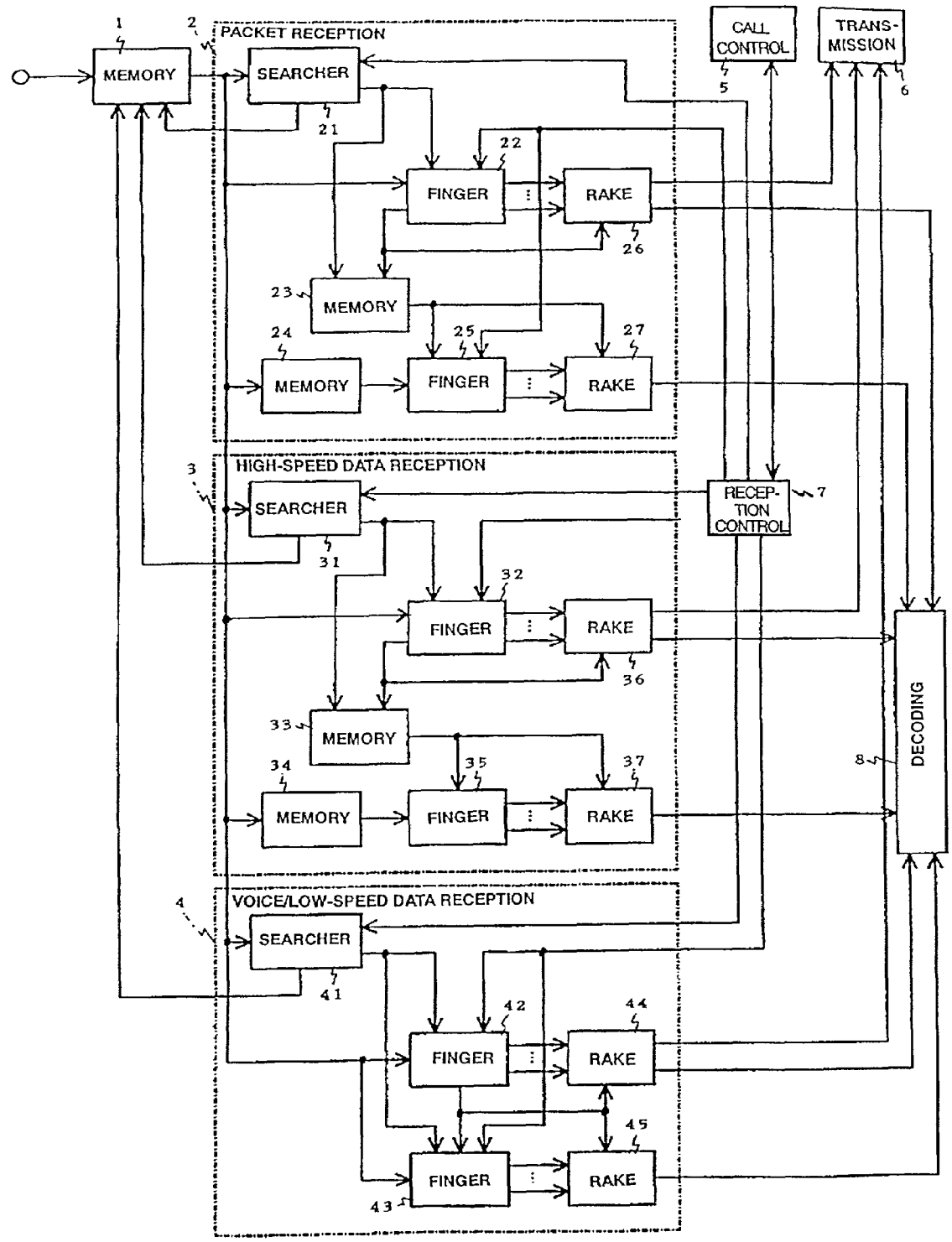
FIG. 1 is a block diagram showing the structure of the CDMA receiving apparatus according to an embodiment of the present invention.

FIG. 1 is a block diagram of the CDMA receiving apparatus of the present invention. Referring to FIG. 1, the CDMA receiving apparatus of the present invention comprises a memory (for reception signal) 1, a packet reception processing block 2, a high-speed data reception processing block 3, a voice/low-speed data reception processing block 4, a call processing control unit 5, a CDMA transmission unit 6, a reception processing control unit 7 and a decoding unit 8.

The packet reception processing block 2 comprises a searcher unit 21, a finger unit (for control field) 22, a memory (for path information) 23, a memory (for data field) 24, a finger unit (for data field) 25, and RAKE combining units 26, 27.

The high-speed data reception-processing block 3 comprises a searcher unit 31, a finger unit (for control field) 32, a memory (for path information) 33, a memory (for data field) 34, a finger unit (for data field) 35 and RAKE combining units 36, 37.

The voice/low-speed data reception-processing block 4 comprises a searcher unit 41, a finger unit (for data field) 42, a finger unit (for data field) 43 and RAKE combining units 44, 45.

The reception processing control unit 7 is connected to the call processing control unit 5, and the RAKE combining unit 26 of the packet reception processing block 2, the RAKE combining unit 36 of the high-speed data reception processing block 3 and the RAKE combining unit 44 of the voice/low-speed data reception processing block 4 are connected to the CDMA transmission unit 6.

The signal flow of FIG. 1 is explained. First, because the packet reception-processing block 2 is substantially the same as the high-speed data reception-processing block 3, only the packet reception-processing block 2 is explained.

The CDMA signal is inputted into the memory (for reception signal) 1 and outputted to the searcher unit 21 immediately. The searcher unit 21 finds out a reception timing of the CDMA signal having a high correlation value with respect to a PN code instructed by the reception processing control unit 7 and outputs a selection signal to the memory (for reception signal) 1. The searcher 21 outputs reception delay amount information of the CDMA signal to the finger unit (for control field) 22 and the memory (for path information) 23.

The memory (for reception signal) 1 outputs the CDMA signal instructed with the selection signal to the finger unit (for control field) 22 and the memory (for data field) 24. The finger unit (for control field) 22 carries out demodulation processing such as despreading, fading vector generation, and detection for the control field of the CDMA signal.

Further, the finger unit (for control field) 22 outputs computed fading vector information to the memory (for path information) 23.

The finger unit (for data field) 25 reads out CDMA signals of an amount which can be treated once from the memory (for data field) 24 and corresponding path information (reception delay amount information and fading vector information) from the memory (for path information) 23 so as to carry out despreading, detection and the like.

The RAKE combining unit 26 outputs a signal obtained by combining detection signals of respective paths inputted from the finger unit (for control field) 22 to the decoding unit 8. Likewise, the RAKE combining unit 27 outputs a signal obtained by combining detection signals of respective paths inputted from the finger unit (for data field) 25 to the decoding unit 8. The RAKE combining unit 26 outputs a transmission control signal such as power control, diversity control and the like to the CDMA transmission unit 6.

Next, the voice/low-speed data reception-processing block 4 will be described. The CDMA signal is inputted to the memory (for reception signal) 1 and outputted to the searcher unit 41 immediately. The searcher unit 41 finds out a reception timing of the CDMA signal having a high correlation value with respect to a PN code instructed by the reception processing control unit 7 and outputs a selection signal to the memory (for reception signal) 1. The searcher unit 41 outputs the reception delay amount information of the CDMA signal to the finger unit (for control field) 42 and the finger unit (for data field) 43.

The memory (for reception signal) 1 outputs the CDMA signal instructed with the selection signal toward the finger unit (for control field) 42 and the finger unit (for data field) 43. The finger unit (for control field) 42 carries out such processing as despreading, fading vector generation, and detection for the CDMA signal. Further, the finger unit (for control field) 42 outputs computed fading vector information to the finger unit (for data field) 43.

The finger unit (for data field) 43 carries out such processing as despreading and detection for the CDMA signal. The RAKE combining unit 44 outputs a signal obtained by combining detection signals of respective paths inputted from the finger unit (for control field) 42 to the decoding unit 8. The RAKE combining unit 45 outputs a signal obtained by combining detection signals of respective paths inputted from the finger unit (for data field) 42 to the decoding unit 8. The RAKE combining unit 44 outputs a transmission control signal for power control, diversity control and the like to the CDMA transmission unit 6. The decoding unit 8 decodes a signal after RAKE combining inputted from the respective reception-processing block so as to obtain a desired signal.

Figure 2:
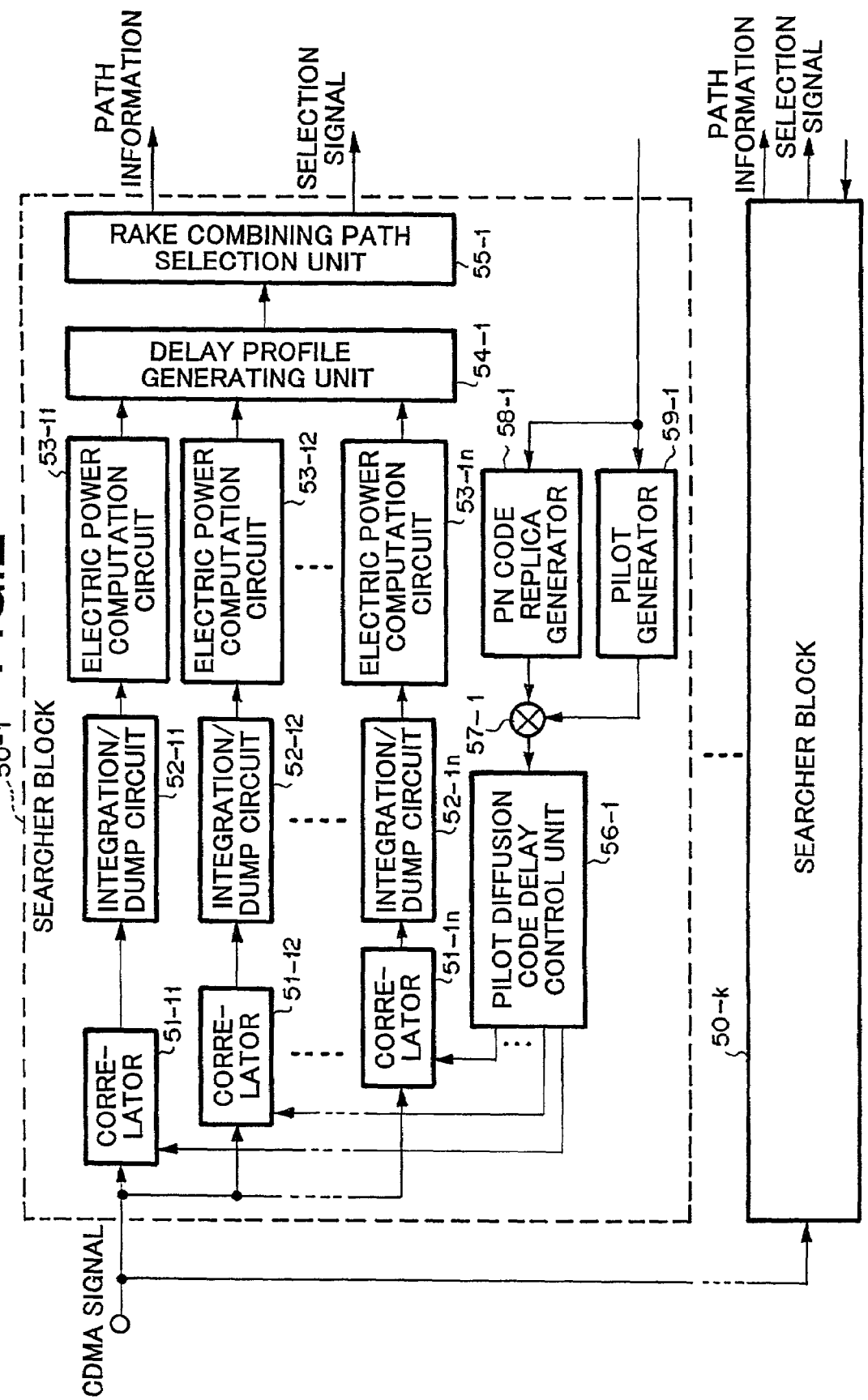
FIG. 2 is a block diagram showing an example of the structure of a searcher unit of FIG. 1.

FIG. 2 is a block diagram showing the structure of the searcher units 21, 31, 41. Referring to FIG. 2, the basic structure of the searcher unit is common in the searcher units 21, 31, 41 in each reception processing block and each of them is comprised of searcher blocks 50-1–50-k. Because each of the searcher blocks 50-1–50-k has the same configuration, only the searcher block 50-1 will be described.

The searcher block 50-1 is comprised of correlators 51-11–51-1n, integration/dump circuits 52-11–52-1n, electric power computation circuits 53-11–53-1n, a delay profile generation unit 54-1, a RAKE combining path selection unit 55-1, a PN code replica generator 58-1, a pilot generator 59-1, a pilot PN code delay control unit 56-1 and a multiplier 57-1.

Here, k indicates the number of searcher blocks or the number of users, which can be searched at the same time. n indicates the width of delay for carrying out a search or how much the CDMA receiving apparatus covers a delay of each path.

A simple signal flow of FIG. 2 will be described. The PN code replica generator 58-1 outputs a PN code replica toward the multiplier 57-1 based on PN code information instructed by the reception processing control unit 7 and the pilot generator 59-1 outputs a pilot signal to the multiplier 57-1.

The multiplier 57-1 multiplies these so as to generate a pilot PN code and outputs it to the pilot PN code delay control unit 56-1. The pilot PN code delay control unit 56-1 outputs a pilot PN code whose phase is shifted by the unit of chip to the correlators 51-11–51-1n.

The correlators 51-11–51-1n output correlated values between these pilot PN codes and CDMA signal inputted from the memory (for reception signal) 1 to the integration/dump circuits 52-11–52-1n. The integration/dump circuits 52-11–52-1n integrate correlated values in the pilot signal section and outputs to the electric power computation circuits 53-11–53-1n.

The electric power computation circuits 53-11–53-1n compute a correlated electric power from each of I and Q correlated values and output to the delay profile generation unit 54-1. The delay profile generation unit 54-1 generates a delay profile using a correlated electric power value at each reception timing.

The RAKE combining path selection unit 55-1 outputs a selection signal to the memory (for reception signal) 1 using a delay profile generated by the delay profile generation unit 54-1, if there is a reception timing having a higher correlated electric power value than a predetermined value.

Figure 3:
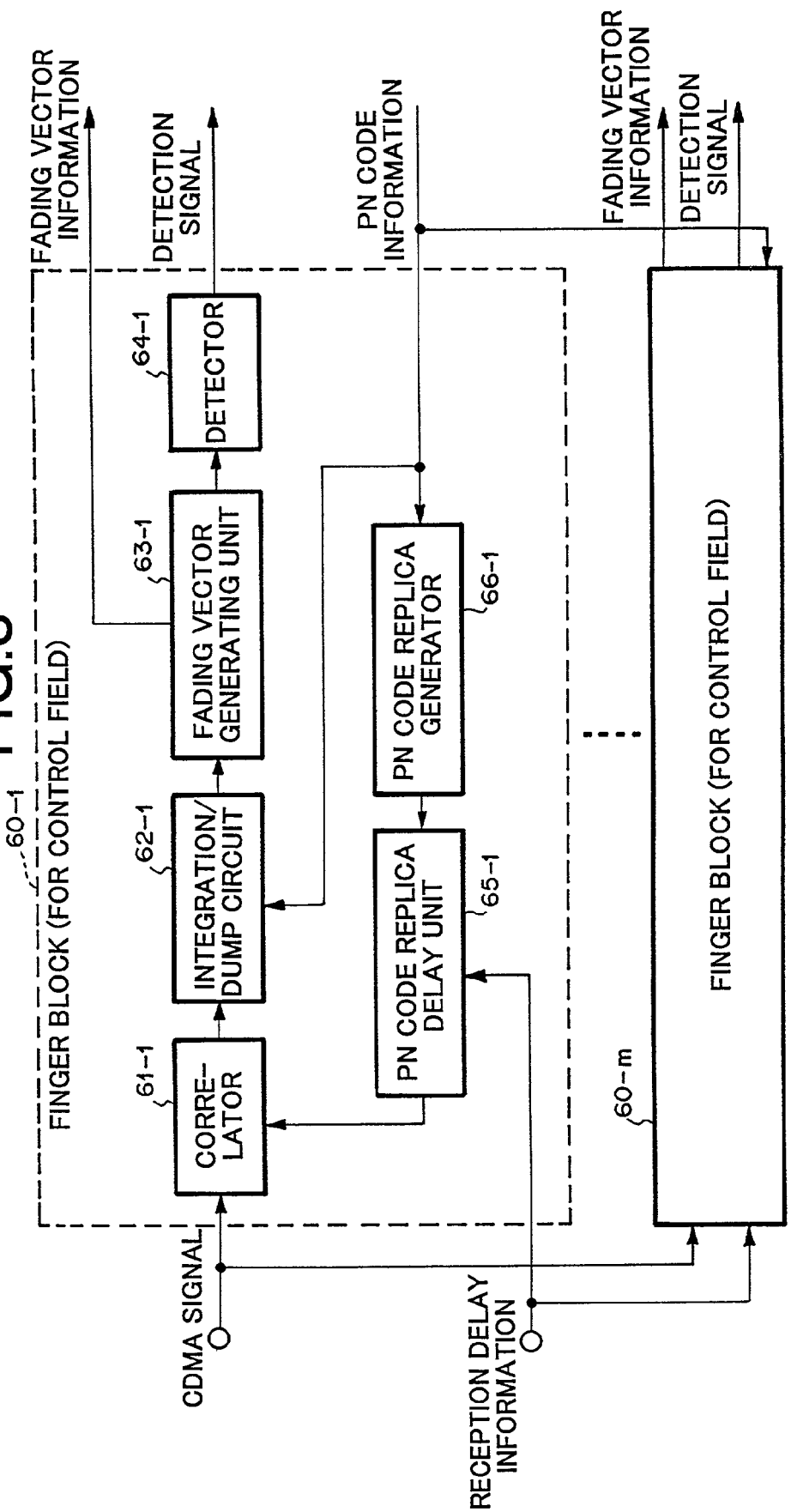
FIG. 3 is a block diagram showing an example of the structure of the finger unit (for control field) of FIG. 1.

FIG. 3 is a block diagram showing an example of the structure of the finger units (for control field) 22, 32, 42 of FIG. 1. In FIG. 3, the basic structure of the finger unit (for control field) is common in the finger units (for control field) 22, 32, 42 in each of the receiving processing blocks and each thereof is comprised of finger blocks 60-1–60-m. Because each of the finger blocks 60-1–60-m has the same structure, only the finger block 60-1 will be described.

The finger block 60-1 comprises a correlator 61-1, an integration/dump circuit 62-1, a fading vector generator 63-1, a detector 64-1, a PN code replica generator 66-1, and a PN code replica delay unit 65-1. m indicates the number of finger blocks or the number of symbols which can be demodulated at the same time. Because the rate of the control field is constant in each service, m is of the same value in each of the finger units (for control field) 22, 32, 42.

A simple signal flow of FIG. 3 will be described. The PN code replica generator 66-1 outputs a PN code replica to the PN code replica delay unit 65-1 based on the PN code information instructed by the reception processing control unit 7. The PN code replica delay unit 65-1 gives a delay amount based on reception delay amount information inputted from the searcher units 21, 31, 41 to the PN code replica and outputs to the correlator 61-1.

The correlator 61-1 diffuses the inputted CDMA signal inversely using this PN code replica and outputs a correlation value signal to the integration/dump circuit 62-1. The integration/dump circuit 62-1 integrates correlation value signals of each chip inputted from the correlator 61-1 based on diffusion rate information contained in PN code information inputted from the reception processing control unit 7 and outputs correlation value signals of each symbol to the fading vector generator 63-1.

The fading vector generator 63-1 estimates a transmission path according to a correlation value signal and generates a fading vector indicating the inclination of IQ axis and the magnitude of a transmitted signal (path accuracy: as the path accuracy is increased, that path can be determined to be a path having a higher reliability). The detector 64-1 detects the phase of a signal using the correlation value signal and fading vector and outputs a detection signal to the RAKE combining units 26, 36, 44.

Figure 4:
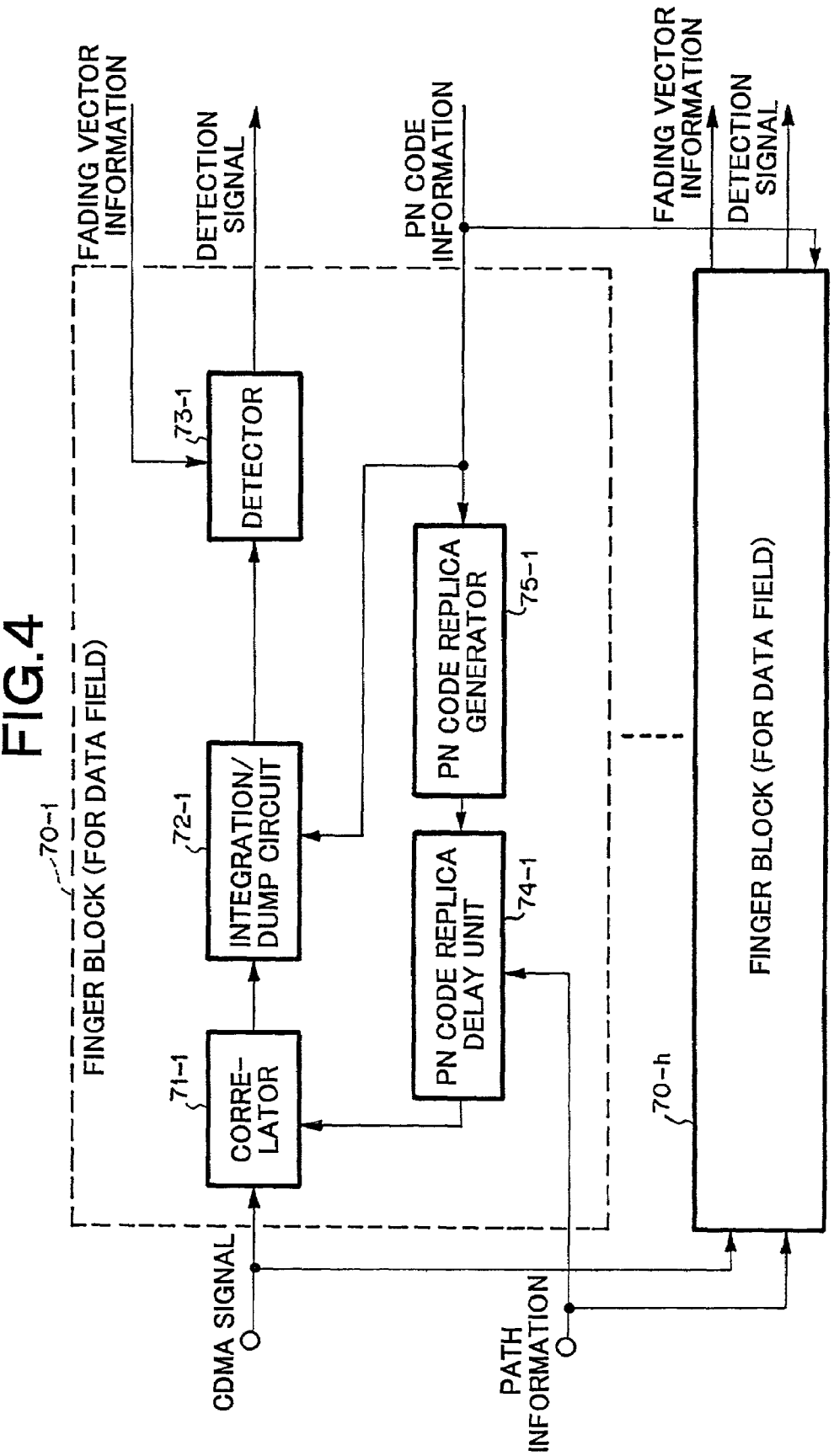
FIG. 4 is a block diagram showing an example of the structure of the finger unit (for data field) of FIG. 1.

FIG. 4 is a block diagram showing an example of the structure of the finger units (for data field) 25, 35, 43. In FIG. 4, the basic structure of the finger unit (for data field) is common in each of the finger units (for data field) 25, 35, 43 in each reception processing block and each finger unit is comprised of finger blocks 70-1–70-h. Because each of the finger blocks 70-1–70-h has the same structure, only the finger block 70-1 will be described.

The finger block 70-1 is comprised of a correlator 71-1, an integration/dump circuit 72-1, a detector 73-1, a PN code replica generator 75-1 and a PN code replica delay unit 74-1. Here, h indicates the number of finger blocks or the number of symbols which can be treated at the same time. Because the rate of the data field differs depending on the service type, often the value h in each reception-processing block is different (the value h of the voice/low-speed data reception processing block 4 is minimized).

A simple signal flow of FIG. 4 will be described. The PN code replica generator 75-1 outputs a PN code replica to the PN code replica delay unit 74-1 based on PN code information instructed by the reception processing control unit 7. The PN code replica delay unit 74-1 provides a PN code replica with path information inputted from the memories (for path information) 23, 33 or a delay amount based on the reception delay amount information inputted from the searcher unit 41 and outputs to the correlator 71-1.

The correlator 71-1 diffuses inputted CDMA signal inversely using this PN code replica and outputs a correlation value signal to the integration/dump circuit 72-1. The integration/dump circuit 72-1 integrates correlation value signals of each chip inputted from the correlator 71-1 based on diffusion rate information contained in the PN code information inputted from the reception processing control unit 7 and outputs correlation value signals of each symbol to the detector 73-1.

The detector 73-1 detects the phase of a signal using a correlation value signal, path information inputted from the memories (for path information) 23, 33 and fading vector inputted from the finger unit (for control field) 41 and outputs a detection signal to the RAKE combining units 27, 37, 45.

Figure 5:
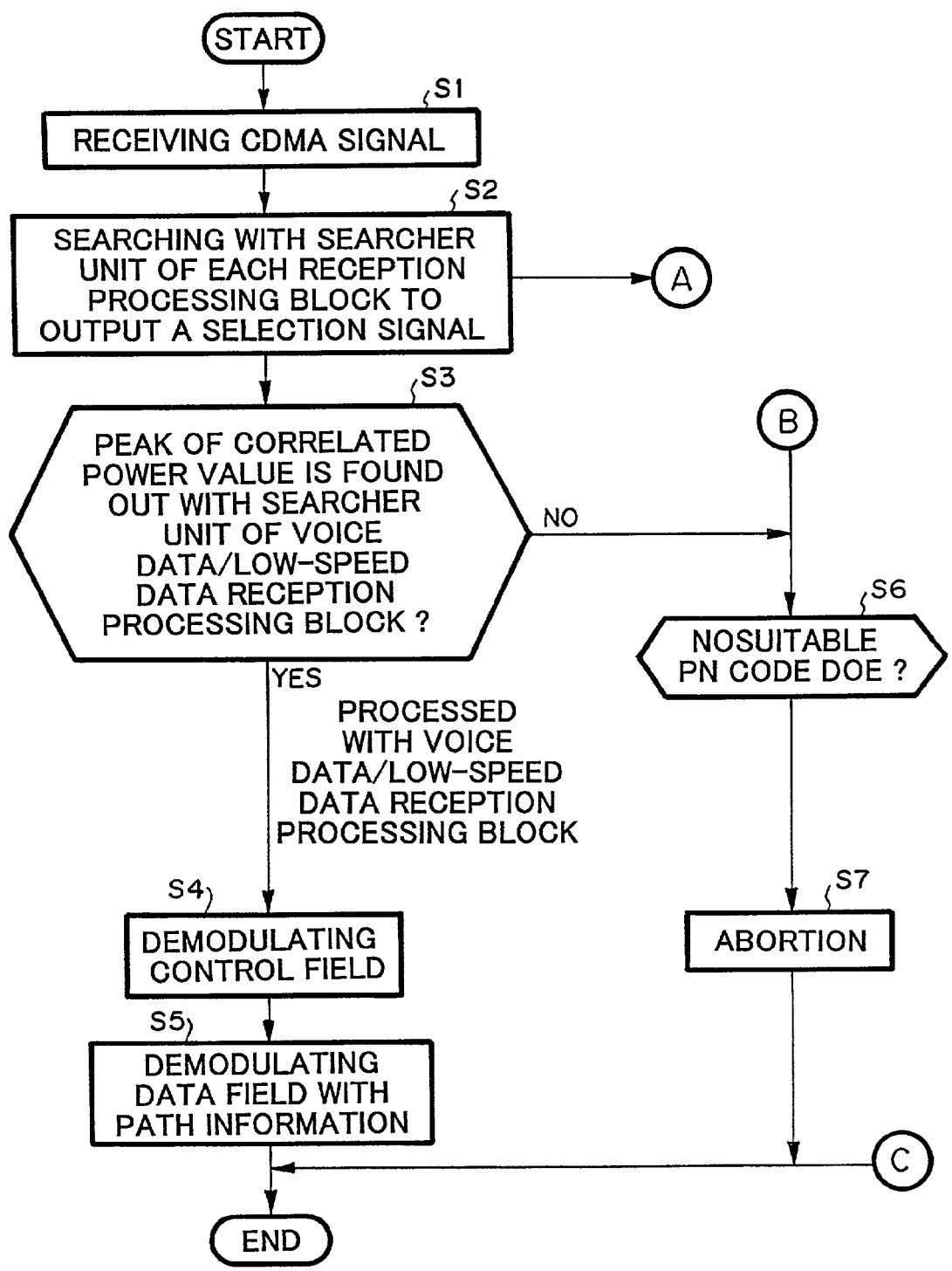
FIG. 5 is a flow chart showing a processing operation of the CDMA receiving apparatus according to an embodiment of the present invention.
Figure 6:
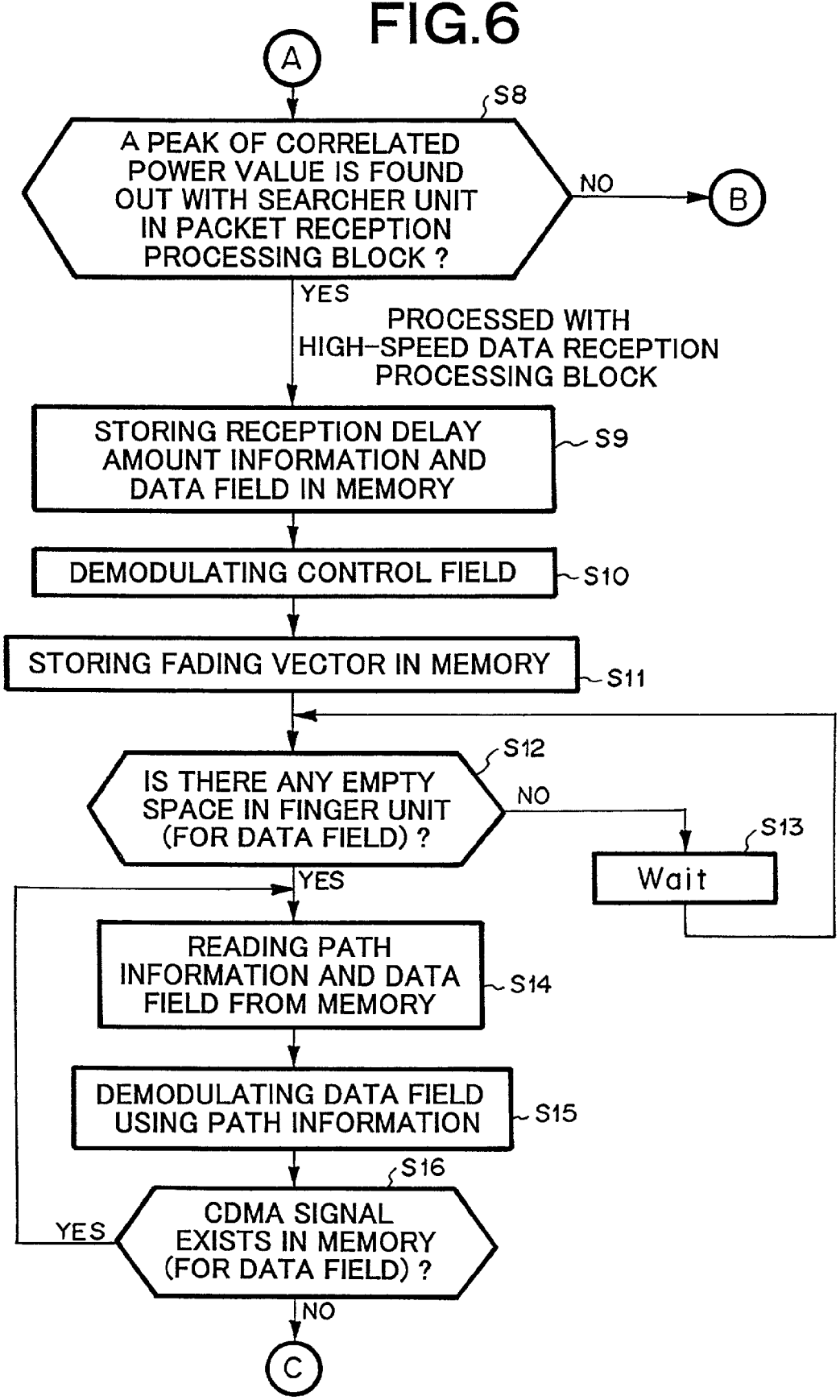
FIG. 6 is a flow chart showing processing operation of the CDMA receiving apparatus according to an embodiment of the present invention.
Figure 7:
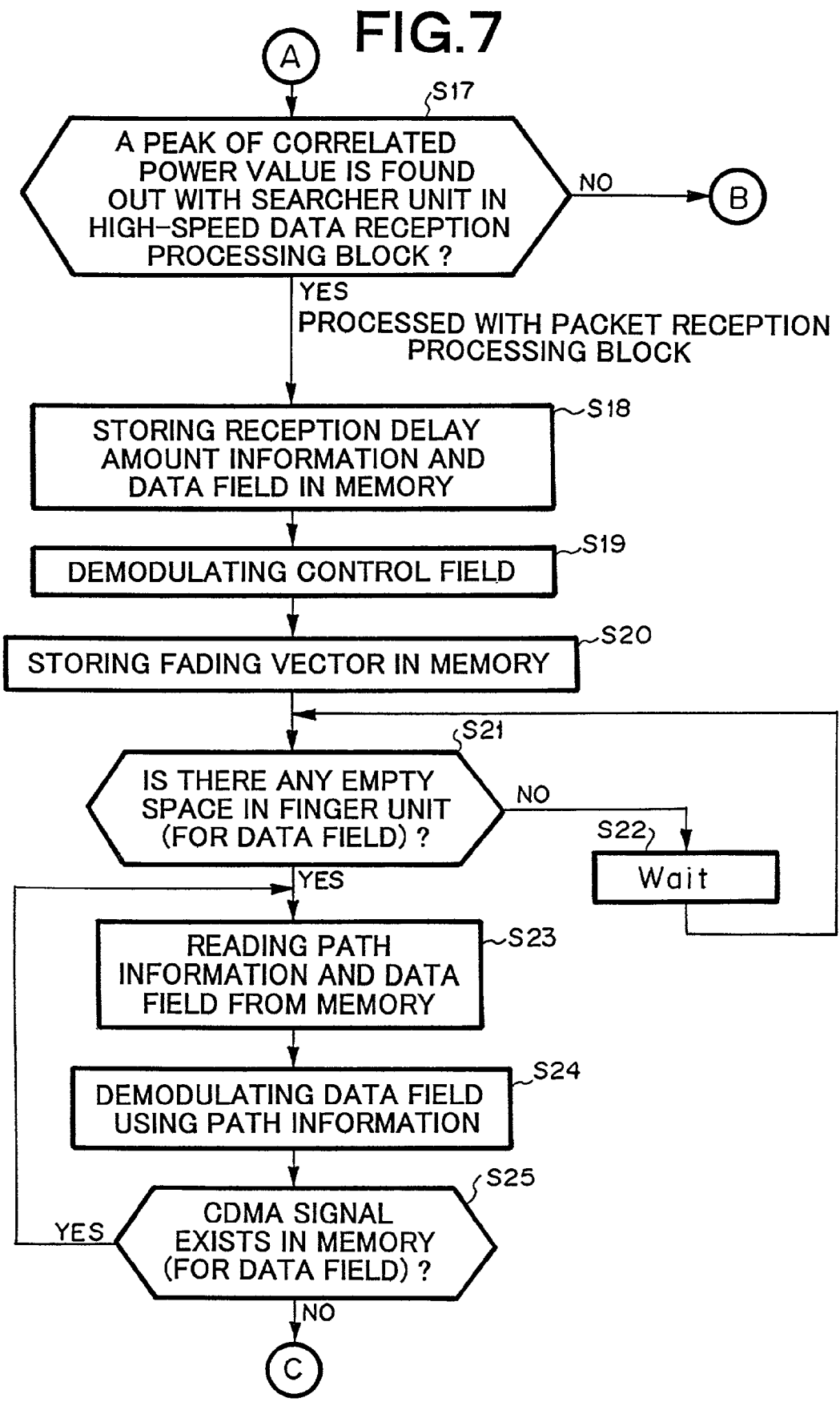
FIG. 7 is a flow chart showing processing operation of the CDMA receiving apparatus according to an embodiment of the present invention.

FIGS. 5–7 are flow charts showing a processing operation of the CDMA receiving apparatus according to an embodiment of the present invention. An operation of the CDMA receiving apparatus according to an embodiment of the present invention when a CDMA signal is inputted therein will be described with reference to FIGS. 1–7.

If the CDMA signal is inputted to the memory (for reception signal) 1, that CDMA signal is outputted to the searcher units 21, 31, 41 immediately (S1 in FIG. 5). The searcher units 21, 31, 41 generate a delay profile and if there is a reception timing having a higher correlated power value than a predetermined value, outputs a selection signal to the memory (for reception signal) 1 (step S2 of FIG. 5).

First, a case where the selection signal is outputted from the voice/low-speed data reception-processing block 4 will be described. The memory (for reception signal) 1 outputs the CDMA signal instructed with the selection signal to the finger unit (for control field) 42 and the finger unit (for data field) 43 of the voice/low-speed data reception-processing block 4.

The searcher unit 41 outputs reception delay amount information to the finger unit (for control field) 42 (step S3 of FIG. 5). The finger unit (for control field) 42 demodulates the control field (step S4 of FIG. 5) and the finger unit (for data field) 18 demodulates data field using its result (step S5 of FIG. 5).

Next, a case where a selection signal is outputted from the packet reception-processing block 2 will be described. The memory (for reception signal) 1 outputs the CDMA signal instructed with the selection signal to the finger unit (for control field) 22 and the memory (for data field) 24 of the packet reception-processing block 2.

The searcher unit 21 outputs reception delay amount information to the finger unit (for control field) 22 and the memory (for path information) 23 (step S8 of FIG. 6). The finger unit (for control field) 22 demodulates the control field (steps S9, S10 of FIG. 6) and outputs a fading vector computed with the control field to the memory (for path information) 23 (step S11 of FIG. 6).

The finger unit (for data field) 25 determines whether or not new demodulation processing is enabled depending on use condition of its finger block (step S12 of FIG. 6). If there is no empty space in the finger block, the data field stored in the memory (for data field) 24 is not demodulated, so that waiting condition arises (step S13 of FIG. 6).

If there is an empty space in the finger block, the finger unit (for data field) 25 reads out path information of an appropriate CDMA signal from the memory (for path information) 23 and then CDMA signals of an amount to be treated once from the memory (for data field) 24 (step S14 of FIG. 6). The finger unit (for data field) 25 demodulates the data field using read-out path information (step S15 of FIG. 6).

If an empty space arises after the demodulation processing is terminated, the finger unit (for data field) 25 detects whether or not there is a CDMA signal, which should be processed in the memory (for data field) 24 (step S16 of FIG. 6).

If the CDMA signal is stored in the memory (for data field) 24, the finger unit (for data field) 25 reads out path information of an appropriate CDMA signal from the memory (for path information) 23 and then reads out the CDMA signals of an amount to be processed once from the memory (for data field) 24 (step S14 of FIG. 6).

If there is not any CDMA signal not demodulated in the memory (for data field) 24, the finger unit (for data field) 25 is returned to a waiting state for receiving of the CDMA signal.

Subsequently, a case where the selection signal is outputted from the high-speed data reception-processing block 3 will be described. An operation of this case is the same as the operation of the packet reception-processing block 2.

The memory (for reception signal) 1 outputs a CDMA signal instructed with a selection signal to the finger unit (for control field) 32 and the memory (for data field) 34 of the high-speed data reception-processing block 3.

The searcher unit 31 outputs reception delay amount information to the finger unit (for control field) 32 and the memory (for path information) 33 (step S17 of FIG. 7). The finger unit (for control field) 32 demodulates the control field (steps S18, S19 of FIG. 7) and outputs a fading vector computed with the control field to the memory (for path information) 33 (step S20 of FIG. 7).

The finger unit (for data field) 35 determines whether or not new demodulation processing is enabled depending on use condition of the finger block (step S21 of FIG. 7). If there is no empty space in the finger block, the demodulation of data field stored in the memory (for data field) 34 is not carried out so that waiting condition arises (step S22 of FIG. 7).

If there is any empty space in the finger block, the finger unit (for data field) 35 reads out path information of an appropriate CDMA signal from the memory (for path information) 33 and reads out CDMA signals of an amount to be processed once from the memory (for data field) 34 (step S23 of FIG. 7). The finger unit (for data field) 35 demodulates the data field using the read-out path information (step S24 of FIG. 7).

If an empty space arises after the demodulation processing is terminated, the finger unit (for data field) 35 detects whether or not there is any CDMA signal, which should be processed in the memory (for data field) 34 (step S25 of FIG. 7).

If the CDMA signal is stored in the memory (for data field) 34, the finger unit (for data field) 35 reads out path information of an appropriate CDMA signal from the memory (for path information) 33 and reads out CDMA signals of an amount to be treated once from the memory (for data field) 34 (Step S23 of FIG. 7).

If there is not any CDMA signal not demodulated in the memory (for data field) 34, the finger unit (for data field) 35 is returned to the CDMA signal reception waiting condition.

Although search is carried out with a PN code instructed by the reception processing control unit 7 (step S3 of FIG. 5, step S8 of FIG. 6, step S17 of FIG. 7), if any peak of a correlated power value cannot be obtained in any reception processing block (step S6 of FIG. 5), the CDMA signal is aborted (step S7 of FIG. 5).

With the above-described structure, it is possible to construct the CDMA receiving apparatus capable of coping with service type of data flexibly and efficiently. That is, such inefficiency that telephone and high-speed data communication are treated in the same network can be eliminated to a maximum extent.

In FIG. 1, the CDMA signal is divided to the packet reception processing block 2, the high-speed data reception processing block 3 and the voice/low-speed data reception processing block 4 depending on the service type thereof, so that a processing suitable for the service type can be conducted in each block.

That is, because the quantity of the high-speed data is enormous, a plurality of the finger blocks 70-1–70-h in the finger unit (for data field) 35 are prepared as compared to voice data and the scale of a circuit of the RAKE combining unit 37 is large.

Although, if the amount of provided data is as large as cannot be processed once by the finger unit (for data field) 35, it is stored in the memory (for data field) 34, its memory capacity is maximized.

The packet data is allowed to be delayed to some extent as compared to voice data and its arrival is intermittent. Thus, by preparing a memory (for data field) 24, the circuit size of the finger blocks 70-1–70-h and the RAKE combining unit 27 in the finger unit (for data field) 25 can be reduced.

As for voice data, by separating the packet reception processing block 2, the high-speed data reception processing block 3 and the voice/low-speed data reception processing block 4, resource of the CDMA receiving apparatus in demodulation processing of high-speed data and packet is extinguished, preventing high-speed data user and packet data user from blocking voice data user which is requested to have real time property. Further, by carrying out demodulation processing immediately without placing any memory, the delay of the demodulation processing for voice data can be suppressed to a minimum extent.

On the other hand, with the aforementioned structure, the CDMA system capable of coping with system condition flexibly and efficiently can be established. For example, in a region including many voice data users, the rate of voice data in the CDMA receiving apparatus and low-speed data reception processing block 4 is increased and in a region including many data communication users, the rate of the high-speed data reception processing block 3 and the packet reception processing block 2 is increased, so as to configure an optimum structure for system condition.

That is, by configuring the structures of the packet card, high-speed card and voice data/low-speed data card, the ratio of the number of cards mounted on the CDMA receiving apparatus is changed to achieve flexible coping.

Further, with the aforementioned structure, a load on upward reception processing at a base station based on the CDMA communication system can be reduced. Although downward transmission processing at the base station based on the CDMA communication system can be controlled according to QoS (Quality of Services) control by accumulating data, the upward QoS control to all terminals is very difficult. Thus, the present invention can be a solution for reducing the load of reception processing in the base station based on the CDMA communication system.

Next, by notifying the reception processing control unit 7 from a higher level unit with service type as well as PN code information of each user, the CDMA receiving apparatus recognizes the service type and allocates the CDMA signals to respective optimum reception blocks so as to carry out demodulation processing. Thus, optimum control on the upward reception processing at the base station based on the CDMA communication system can be carried out from the higher level unit.

Conventionally, the finger block and RAKE combining unit capable of processing at the maximum rate and the maximum number of users at the same time requested from the system condition are structured. Because by storing data in the memories (for data field) 24, 34, the quantity of data which can be processed at the same time can be reduced, the circuit size of the finger units 22, 25, 32, 35 and the RAKE combining units 26, 27, 36, 37 in the packet reception processing block 2 or the high-speed data reception processing block 3 can be reduced.

Further, because the demodulation processing of the control field is carried out immediately although data fields of the packet data and high-speed data is delayed, the present invention can cope with such processing about power control, diversity control and the like without any problem.

Figure 8:
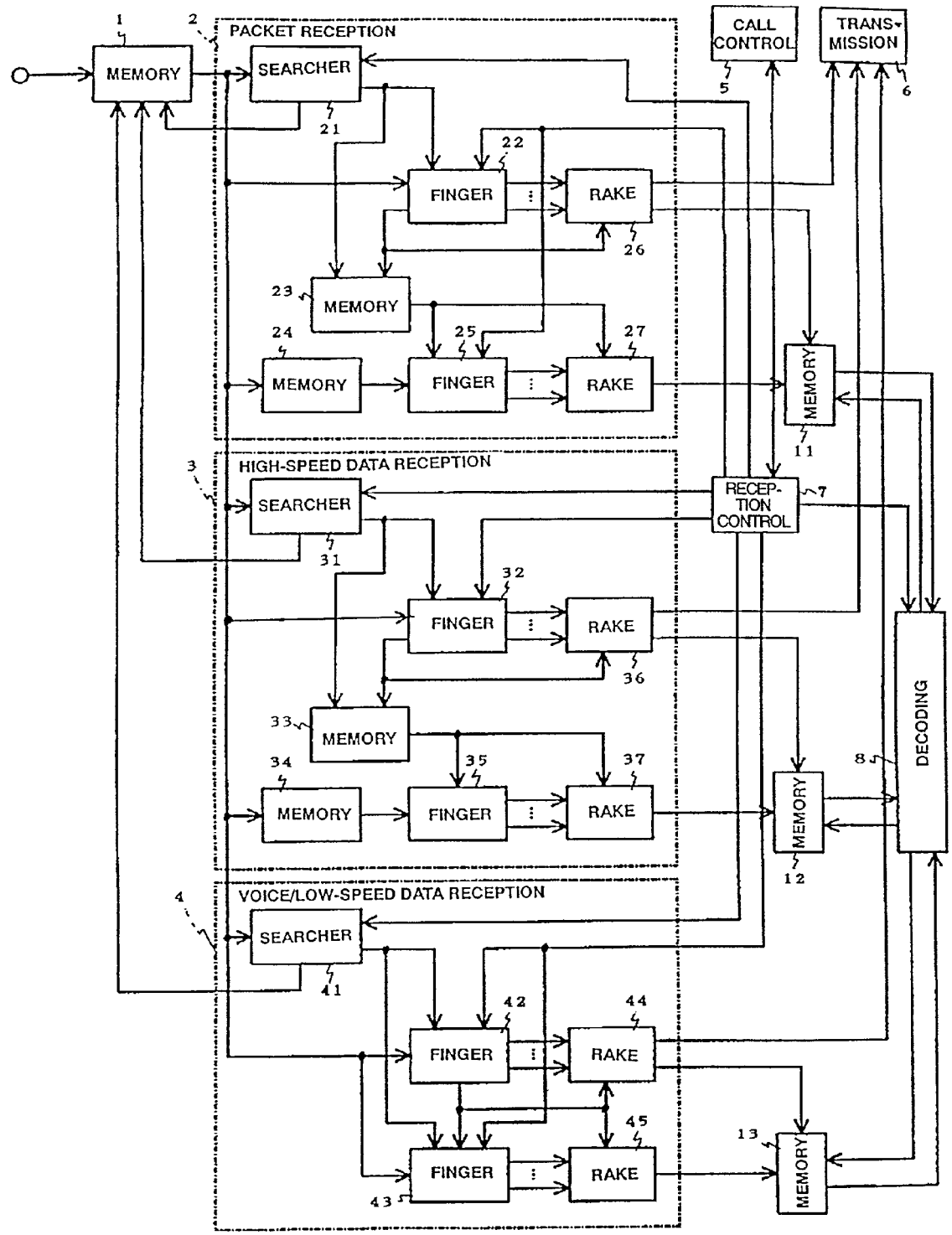
FIG. 8 is a block diagram showing the structure of the CDMA receiving apparatus according to another embodiment of the present invention.

FIG. 8 is a block diagram showing the structure of the CDMA receiving apparatus according to other embodiment of the present invention. In FIG. 8, the CDMA receiving apparatus according to other embodiment of the present invention has the same structure as the CDMA receiving apparatus of the embodiment of the present invention shown in FIG. 1, except that the memories 11–13 are added between the RAKE combining units 26, 27 of the packet reception processing block 2 and the decoding unit 8, between the RAKE combining units 36 and 37 in the high-speed data reception processing block 3 and the decoding unit 8, and between the RAKE combining units 44 and 45 in the voice/low-speed data reception processing block 4 and the decoding unit 8. Same reference numerals are attached to the same component and operations of the same components are the same as the aforementioned embodiment of the present invention.

The RAKE combining units 26, 36, 44 for carrying out the RAKE combining of the control field store data necessary for decoding such as format information of data field in the memories 11–13. The RAKE combining units 27, 37, 45 for carrying out the RAKE combining of the data field store data in the memories 11–13. The decoding unit 8 reads out data having a high priority successively from the memories 11–13 according to the priority notified from the reception processing control unit 7 so as to carry out the decoding processing.

According to this embodiment, by adding the memories 11–13, the processing load of the decoding unit 8 when particularly packet data users or high-speed data users increase is reduced and real time property of voice data is assured.

Figure 9:
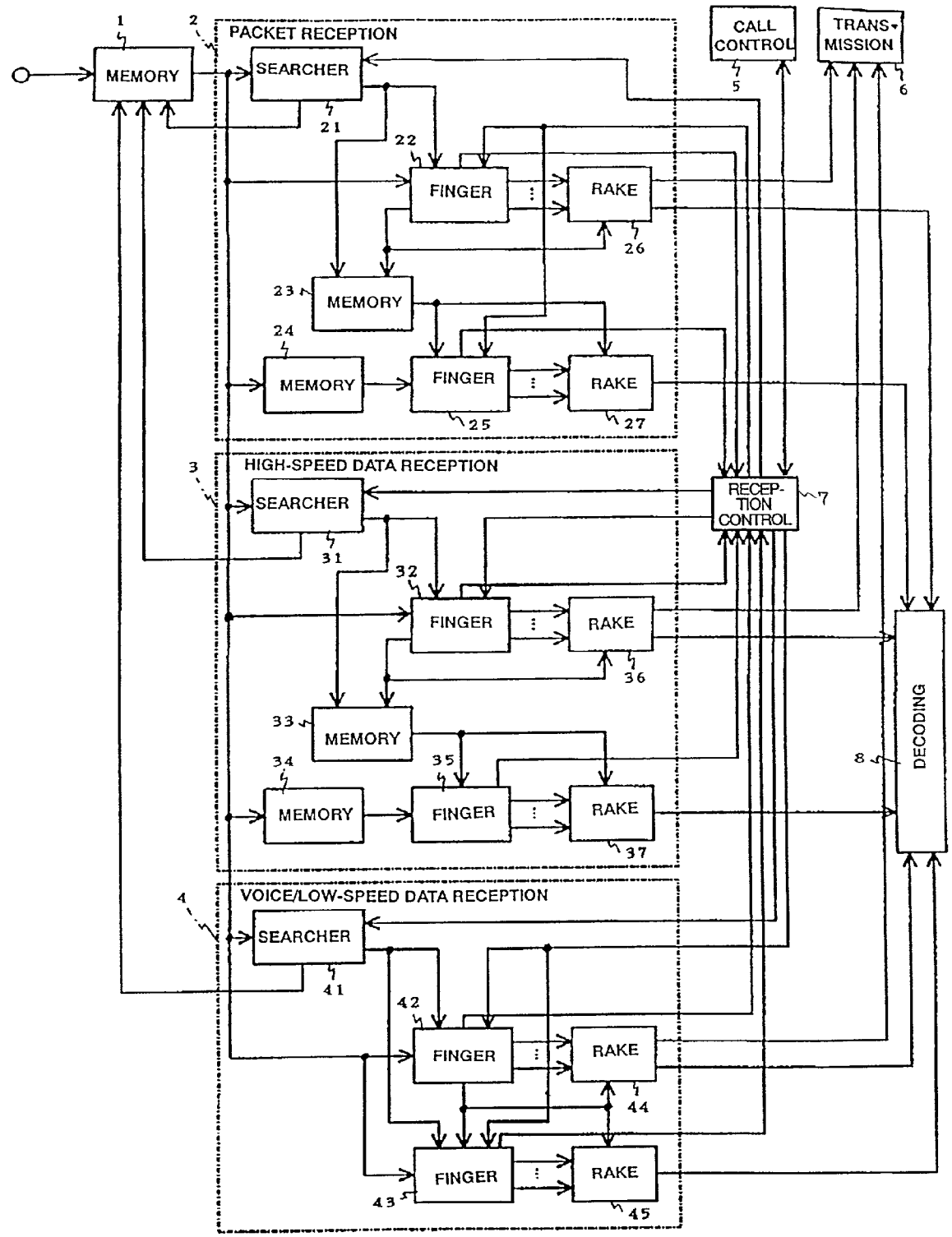
FIG. 9 is a block diagram showing the structure of the CDMA receiving apparatus according to the other embodiment of the present invention.

FIG. 9 is a block diagram showing the structure of the CDMA receiving apparatus according to still other embodiment of the present invention. In FIG. 9, the CDMA receiving apparatus of the still other embodiment of the present invention has the same structure as the CDMA receiving apparatus of the aforementioned embodiment of the present invention shown in FIG. 1 except that empty region information is outputted from the finger units (for control field) 22, 32, 42 and the finger units (for data field) 25, 35, 43 to the reception processing control unit 7. Like reference numeral are attached to the same components. Operations of the same components are the same as the embodiment of the present invention.

If the reception processing control unit 7 has to add new voice data user or low-speed data user based on the empty region information from the finger units (for control field) 22, 32, 42 and the finger units (for data field) 25, 35, 43 because there is no empty space in the resource of the voice/low-speed data reception processing block 4, voice data or low-speed data is allocated to an empty resource in the packet reception processing block 2 or the high-speed data reception processing block 3.

Figure 10:
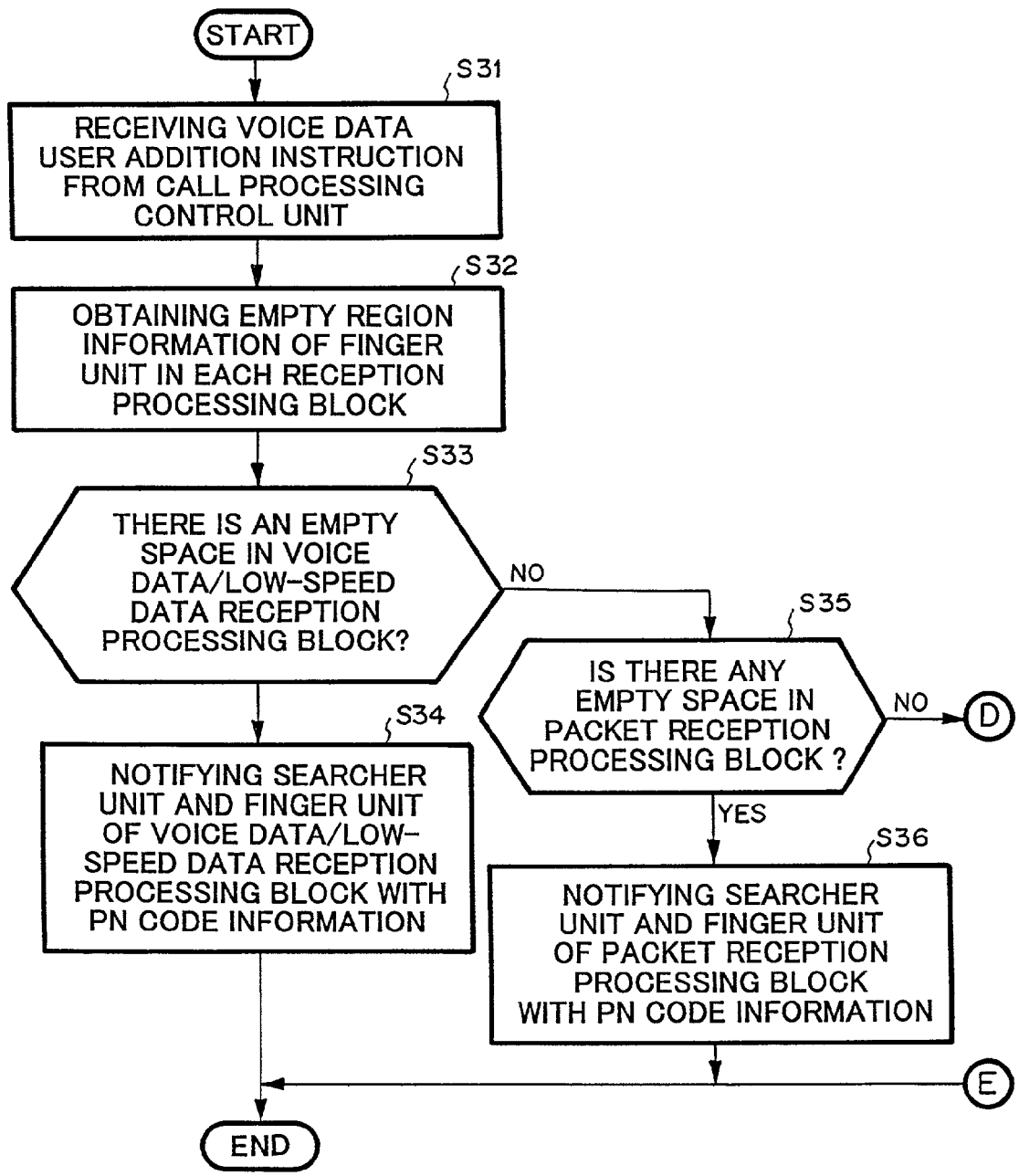
FIG. 10 is a flow chart showing an operation of the receiving processing control unit of FIG. 9.
Figure 11:
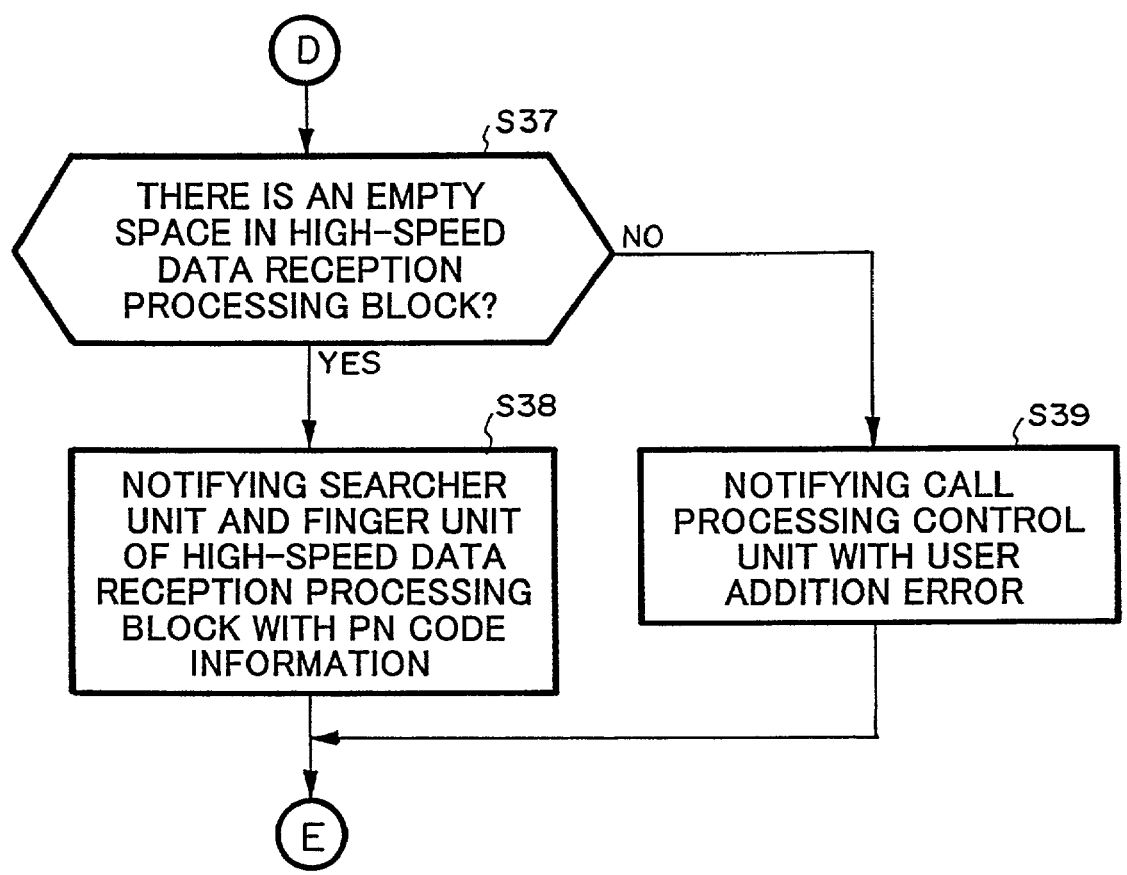
FIG. 11 is a flow chart showing an operation of the receiving processing control unit of FIG. 9.
Figure 12:
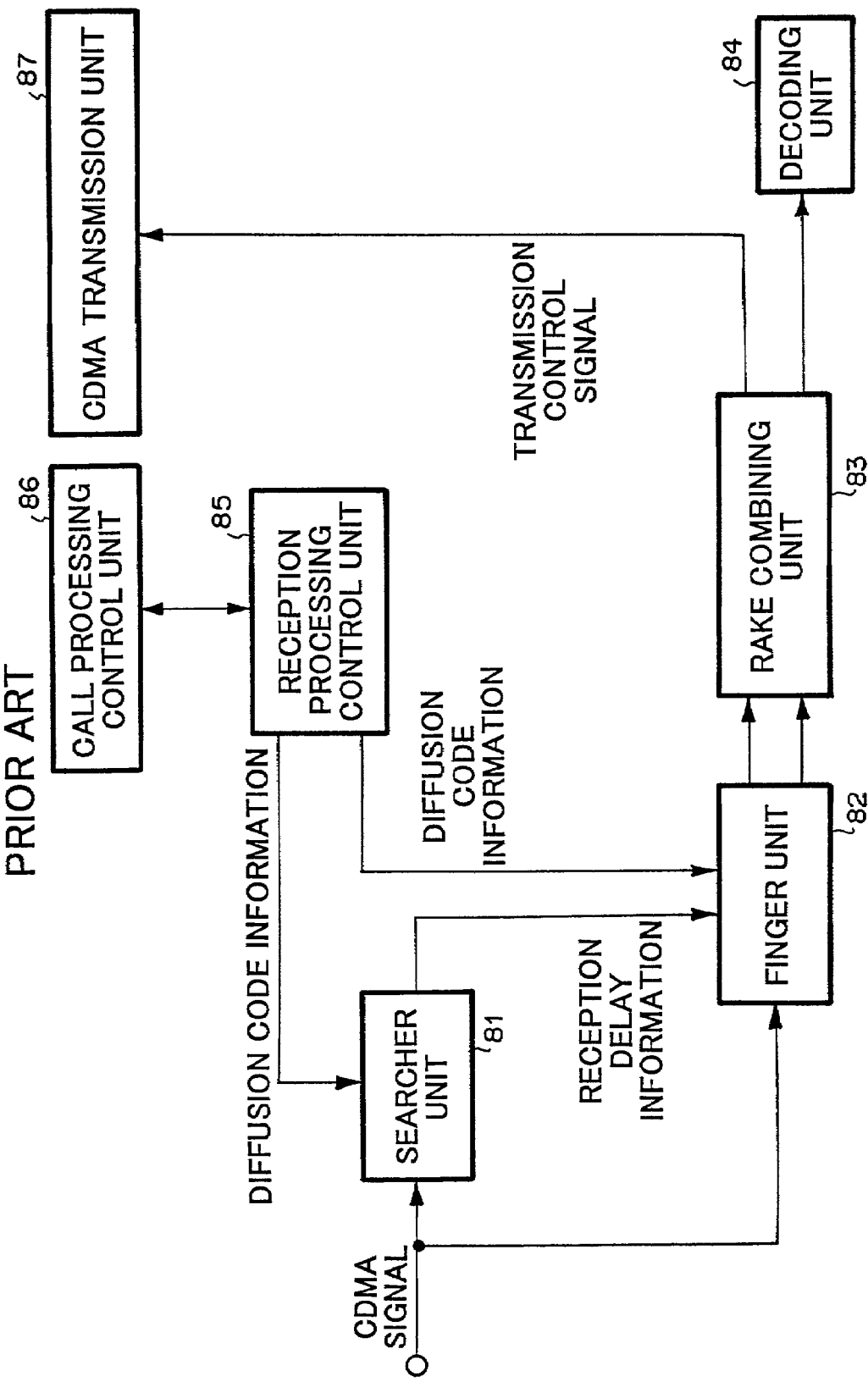
FIG. 12 is a block diagram showing the structure of a conventional CDMA receiving apparatus.

FIGS. 10 and 11 are flow charts showing an operation of the reception processing control unit 7 shown in FIG. 9. An operation of the reception processing control unit 7 will be described with reference to FIGS. 9–11. Flow charts of FIGS. 10, 11 show a flow of a case where voice data user is added. In case where low-speed data is added, the same operation arises as the case where the voice data user is added.

If the reception processing control unit 7 receives a voice data user addition instruction from the call processing control unit 5 together with its user information (step S31 of FIG. 10), the empty region information of the finger units (for control field) 22, 32, 42 and the finger units (for data field) 25, 35, 43 of each reception processing block are obtained (step S32 of FIG. 10).

First, the reception processing control unit 7 determines whether the finger units (for control field) 42 and the finger unit (for data field) 43 of the voice/low-speed data reception-processing block 4 can carry out reception processing (step S33 of FIG. 10).

The reception processing control unit 7 outputs PN code information to the voice/low-speed data reception processing block 4 if there is an empty space in the voice/low-speed data reception processing block 4 (step S34 of FIG. 10). If there is no empty space in the voice/low-speed data reception processing block 4, the reception processing control unit 7 determines whether or not the finger units (for control field) 22 and the finger unit (for data field) 25 of the packet reception processing block 2 can carry out reception processing (step S35 of FIG. 10).

If there is an empty space in the packet reception processing block 2, the reception processing control unit 7 outputs PN code information to the packet reception processing block 2 (step S36 of FIG. 10). If there is no empty space in the packet reception processing block 2, the reception processing control unit 7 determines whether or not the finger units (for control field) 32 and the finger unit (for data field) 35 of the high-speed data reception processing block 3 can carry out reception processing (step S37 of FIG. 11).

If there is an empty space in the high-speed data reception processing block 3, the reception processing control unit 7 outputs PN code information to the high-speed data reception processing block 3 (step S38 of FIG. 11). If there is not empty space in the high-speed data reception-processing block 3, the reception processing control unit 7 outputs a user addition error to the call processing control unit 5 (step S39 of FIG. 11).

According to the other embodiment of the present invention shown in FIG. 9, it is possible to avoid a case where the reception processing cannot be carried out even if there is an empty space in the resource of the packet reception processing block 2 and the high-speed data reception processing block 3 when voice data user and low-speed data user increase. In the finger unit (for data field), the voice data and low-speed data have smaller number of finger blocks required for demodulation processing as compared to the packet data and high-speed data and an influence is slight even if the finger units (for data field) 25, 35 of the packet reception processing block 2 and the high-speed data reception processing block 3 are employed. A merit that the resource of the CDMA receiving apparatus can be used efficiently is high.

Next, empty region information to be obtained by the reception processing control unit 7 will be described. The finger units (for control field) 22, 32 have a smaller number of finger blocks necessary for a certain number of users than the finger units (for data field) 25, 35 and thus, usually the finger units (for control field) 22, 32 have a smaller number of the finger blocks.

If voice data users or low-speed data users are allocated in the packet reception processing block 2 and the high-speed data reception processing block 3, the finger block number thereof becomes short earlier than the finger units (for data field) 25, 35, so that the empty region information of the finger units (for control field) 22, 32 is indispensable. As for the finger units (for data field) 25, 35, if a large amount of the CDMA signals are stored in the memories (for data field) 24, 34, the empty region information is absolutely necessary because even if the resource of the finger units (for control field) 22, 32 is empty, there may be sometimes no resource in the finger units (for data field) 25, 35.

What is claimed is:

1. A code division multiple access (CDMA) receiving apparatus for receiving data of a plurality of service types, which comprises a plurality of reception processing blocks for carrying out reception processing for said data;

a decoder for decoding a received signal outputted from said plurality of said reception processing blocks via a memory of a plurality of memories; and the plurality of memories, wherein each memory is connected between said decoder and a first RAKE combiner and a second RAKE combiner in each of the plurality of reception processing blocks;

wherein said data are allocated to said reception processing blocks, depending upon said service types;

wherein said service types of data include packet data, high-speed data, voice data, and low-speed data; and wherein said decoder reads out received signals having a high priority based on the service type of the received signals successively from said memories so as to carry out decoding processing.

2. A code division multiple access (CDMA) receiving method for receiving data of a plurality of service types, which comprises the steps of:

storing received CDMA data signal;

allocating said received CDMA signal to one of a plurality of reception processing blocks, depending on the service type;

storing a received signal in one of a plurality of memories, wherein each of the plurality of memories is connected between a decoder and a first RAKE combiner and a second RAKE combiner in each reception processing block, reading out received signals having a high priority based on the service type of the received signals successively from said memories; and decoding said received signals read out from said memories;

wherein said service types of data include at least packet data, high-speed data, voice data, and low-speed data.

* * * * *